May 23, 1967
H. E. KRAUSE ETAL
3,320,814
DEVICE FOR INDICATING WHEEL IMBALANCE
Filed Feb. 24, 1964
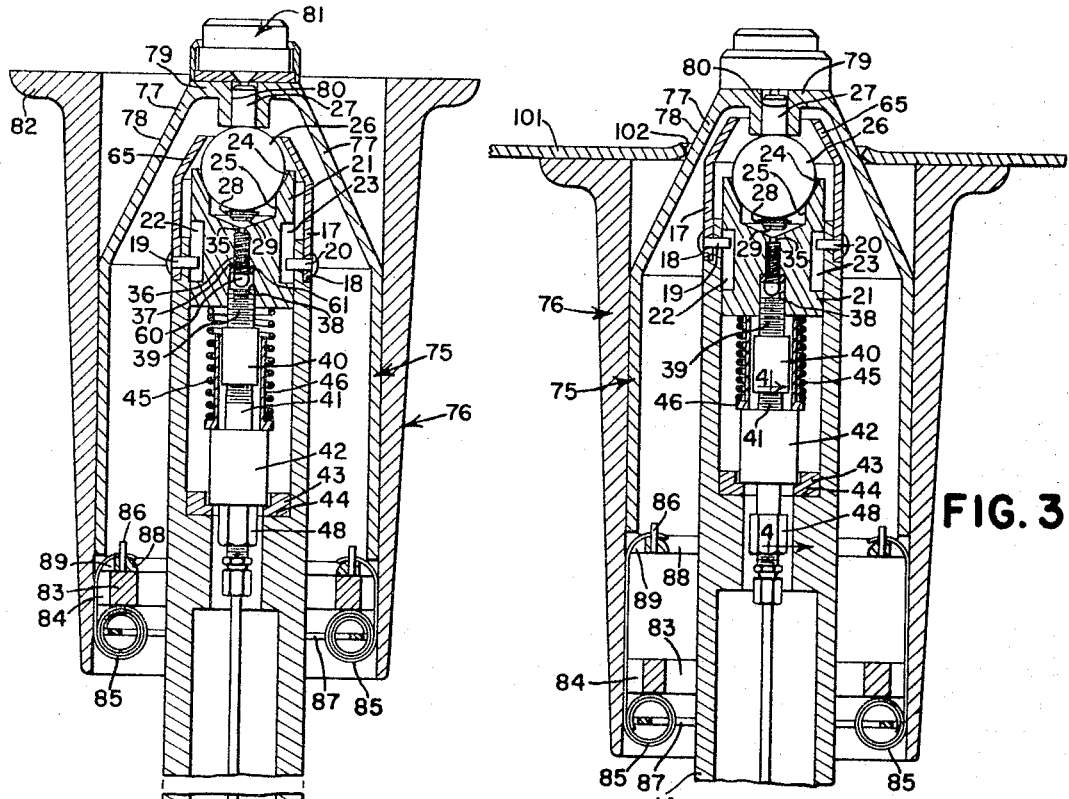
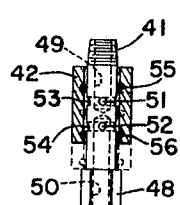
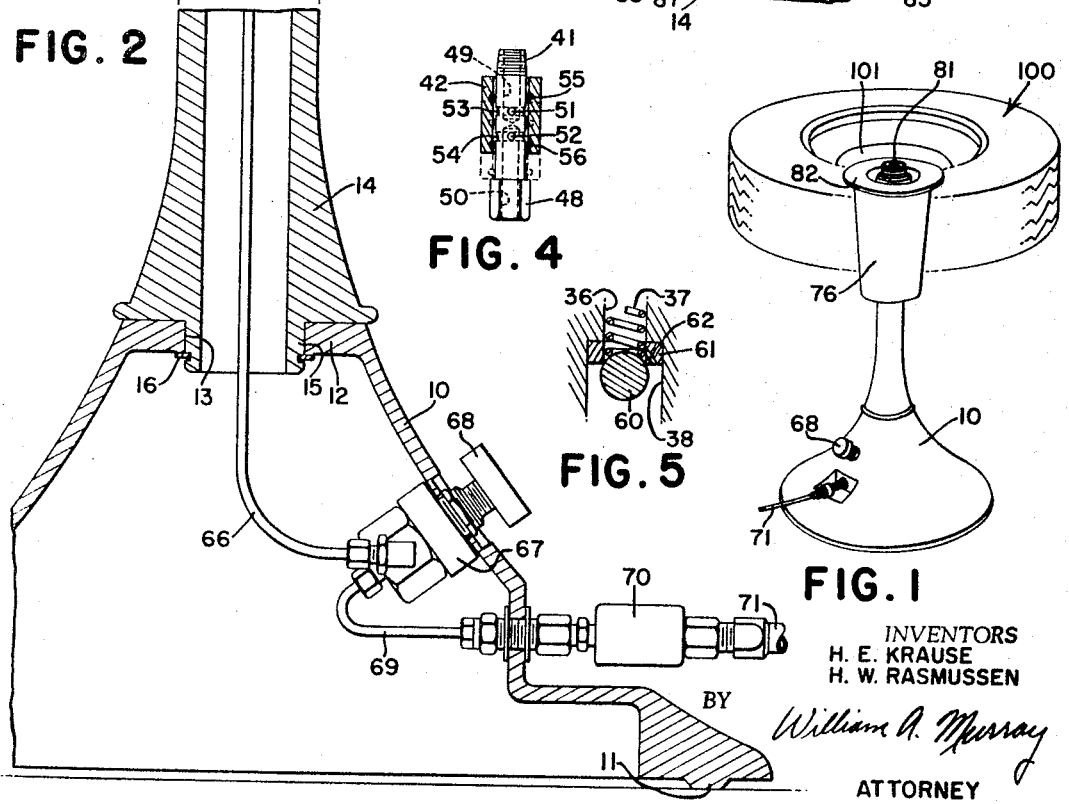
INVENTORS
H. E. KRAUSE
H. W. RASMUSSEN
BY
*William A. Murray*
ATTORNEY United States Patent Office 3,320,814
Patented May 23, 1967

3,320,814
DEVICE FOR INDICATING WHEEL IMBALANCE
Harold E. Krause, Milan, Ill., and Harvey W. Rasmussen, Tampa, Fla., assignors to K & R Engineering Company, Inc., Milan, Ill., a corporation of Illinois
Filed Feb. 24, 1964, Ser. No. 346,935
6 Claims. (Cl. 73—484)

This invention relates to an apparatus used for determining the balance characteristics of a wheel and more specifically to an apparatus signifying the specific location of the overall imbalance in a wheel. Still more particularly this invention relates to such an apparatus utilizing air suspension for a wheel supporting device that is highly sensitive to an unbalanced condition in a wheel.

It is the primary object of the present invention to provide a new and novel type of support for a wheel supporting platform that includes a hardened ball or sphere connected to the platform and suspended in an inverted upwardly opening conical surface provided internally of a pedestal member. Air under pressure is passed under the sphere or ball until it floats on air to provide a minimum of friction resisting tilting of the platform. Any imbalance on the platform, such as would occur by applying an unbalanced wheel thereto, would therefore effect tilting of the platform. Tilting or imbalance may be detected by a conventional type level guage incorporated as a part of the platform.

Specifically it is an object of this invention to provide a wheel supporting structure composed in part of inner and outer vertical cylindrical members telescopingly related. The inner of the members carries the ball or sphere internally thereof and is further characterized by an upper and outer conical shaped portion adapted to receive the inner annular edge of a wheel hub. The outer member has a radial platform substantially on the level of the conical portion that receives the flat radial surface or hub of the wheel. Spring biasing means are provided to normally place the conical portion in recessed relation with the outer member. However, upon the weight of the wheel being applied to the outer member, it will overcome the resistance of the spring means and drop until the conical surface engages the inner annular edge of the wheel. This action centers the wheel on the platform so that any unbalanced condition on the platform is due to the improper balance within the wheel and not due to an eccentric relation between the wheel and support.

It is a further object of the invention to provide a unique arrangement of valves between the air pressure source and balancing apparatus that operates automatically to open as the weight of the wheel is applied and also minimizes the effect of pulsating air pressure in the air cushioned ball and socket joint.

Other objects and advantages of the invention will become apparent to those skilled in the art as the nature of the invention is better understood from the following description and as shown in the accompanying drawings.

FIG. 1 is a perspective view of the device with a wheel shown in representative form mounted thereon.

FIG. 2 is a vertical sectional view through the center of the device.

FIG. 3 is a view similar to FIG. 2 but showing only the upper portion of the device with parts thereof repositioned in a manner occurring due to the weight of a wheel being applied.

FIG. 4 is a sectional view taken along the line 4—4 of FIG. 3.

FIG. 5 is an enlarged vertical sectional view taken through the antipulsating value structure in the device.

The device for determining the balance of a wheel is composed in part of an upright pedestal assembly having a lower base section 10 with a lower annular portion having a depending bead 11 normally resting on a floor. The base section 10 has an upper horizontal portion 12 with an inner circular opening 13 receiving a lower downwardly projecting pilot 15 of an upper pedestal wall or part 14. The pilot 15 is fixed in the upper portion 12 by a snap ring 16 seated in an annular slot at the base of the pilot 15. The pedestal base 10 and pedestal part 14 are hollow for receiving air conduit means, later to be explained. Also, the base 10 and part 14 are circular in cross section and are formed about an upright axis.

The upper end of the pedestal part 14 is provided with a cap 17 carried on an outer shoulder 18, integral with the part 14, and is fixed to the part 14 by a pair of diametrically opposite and inwardly projecting set screws 19, 20. The screws 19, 20 project inwardly of the pedestal wall 14 and serve as vertical guides for a member 21 that moves vertically in the pedestal part 14. Vertical slots 22, 23 are provided in the sides of the member 21 to receive the screws 19, 20. The upper portion of the member is provided with an internal inverted conical shaped and upwardly opening cavity or socket 24. The socket 24 has an internal annular base cavity 25. The cavity 24 receives a sphere or ball 26 having a vertical pin 27 extending through it and being fixed thereto by a snap ring 28 carried on a lower end 29 of the pin 27. The lower end 29 and ring 28 as well as the lower portion of the sphere 26 is disposed in the base cavity 25.

An air passage or conduit means is provided in the member 21 and includes a small passage 35 adjacent to and opening into the underside of the cavity 25, and an enlarged midpassage 36 directly beneath the passage 35 containing a spring or biasing member 37. A third or still larger passage 38 is provided beneath the midpassage 36 and is threaded at its lower end to receive the upper end of a short pipe or conduit 39 depending from the member 21.

The lower end of the pipe 39 is rigidly joined by a pipe fitting 40 to an upper threaded end of a valve part 41 slidably carried in a second valve part 42. The valve part 42 is carried on a finished abutment plate 43 in turn carried on an internal annular shoulder 44 provided on the pedestal part 14. A coil spring 45 bears against the underside of the member 21 and the top of the valve part and maintains the valve part 42 against the abutment plate 43 and also biases the member 21 to an uppermost position. A guide cylinder 46 is provided internally of the spring 45 and is disposed outwardly of the fitting 40.

The valve part 41 extends through the valve part 42 and has its lower end fixedly attached to a fitting 48, the upper end of which is adjacent the lower end of the valve part 42.

Referring now to FIG. 4 for details of the valve assembly, the valve part 41 has upper and lower central air passageways 49, 50 and further has a pair of vertically spaced radial inlets 51, 52 opening into the respective passageways and outer annular grooves 53, 54 on the surface of the valve part 41. The outer valve part 42 carries a pair of vertical spaced internal rings 55, 56 that bear against the outer surface of the inner valve part 41. The part 42 is spaced radially from the part 41 sufficiently to permit a flow of air, unless restricted or blocked, between the passageways 49, 50 via the inlets 51, 52. Upon the valve part being in its upper position, as shown in FIG. 1 or in dotted representation in FIG. 4, the upper ring 55 is positioned between the grooves 53, 54 and blocks air communication between the passageways 49, 50. The lower ring 56 will prevent loss of air from the passageway 50.

Upon the valve part 41 being driven downwardly, as shown in FIGS. 3 and 4, the upper and lower rings 55, 56 will be disposed above and below the grooves 53, 54 respectively and air communication will occur between the passageways 49, 50.

Directly above the main or first valve means is a second valve means utilized primarily for minimizing pulsations in the flow of air between the sphere 26 and the conical surfaced socket 24. The second valve is composed of a ball 60 that seats against the underside of a ring 61 positioned in the upper portion of the midpassage 36. The ball 60 normally bears against the spring 37, the latter effecting a slight biasing force downwardly against the ball. The ring 61 is provided with a small diagonally extending air bleeding groove 62 that permits a constant communication between the lower passage 38 and midpassage 36. The upper end of the pipe 39 will retain the ball 60 in relatively close relation to its seating ring 61.

The cap 17 includes an upper conical shaped portion 65 extending over but not in engagement with the sphere 27. The portion 65 is open at its top to permit the pin 27 to extend through the cap but operates to loosely retain the sphere 26 in the area defined by the conical socket 24.

The conduit means leading to the base of the socket 25 further includes a flexible air conduit 66 extending from fitting 48 downwardly to a main pressure regulating air valve 67 fixed to and internally of the pedestal base 10. The valve 67 is controlled manually, depending upon the weight of wheel, by an external control 68 on the base 10. A second conduit 69 extends from the valve 67 to external fittings 70 on the base which in turn is connected to external air pressure via pipe or hose 71.

A wheel support structure is composed of inner and outer cylindrical members 75, 76 respectively concentrically disposed relative to the pedestal, and telescopingly related to one another. The inner member 75 has an upper end 77 with an outer conical surface 78 that projects above and encompasses the upper end of the pedestal, the cap 17, and sphere 26. The end 77 has an upper apex portion 79 with a downwardly opening cavity 80 adapted to snugly receive and connect to the upper end of the pin 27. The portion 79 also includes a level indicating device, indicated at 81, visible from above that may be a standard air bubble type.

The outer member 76 has a horizontal radial flange or shelf means 82 projecting outwardly from the top of the cylindrical member 76. The upper surface of the flange 82 receives the underside of a hub portion 101 of the wheel when the latter is laid flat thereon.

The lower end of the cylindrical member 76 is formed with an inwardly projecting shoulder 83 with openings 84 extending vertically therethrough for passing ends of a constant tension spring means comprising four constant tension springs 85 spaced ninety degrees apart around the cylinder members 75, 76. The upper end portions of the springs 85 are clipped to an internal lower edge flange 88 of the inner member 75 by pins 86. Suitable openings 89 are provided in the flange 88 to pass the extended coils of the springs 85. The main or coiled portions of the springs 85 are carried beneath and bears against the underside of the shoulder 83. An annular ring 87 is disposed within the coils and maintains the springs 85 at a constant radial distance from the pedestal part 14.

When not in operation, the parts of the structure rest in positions as shown in FIG. 2. In operation the parts of the structure move into positions shown in FIG. 3 and cooperate to indicate the balanced condition of the wheel in the following manner. The pressure of air in the conduit 66 and passageway 50 is manually regulated by the valve 67, heavier wheels requiring more pressure than lighter wheels. A wheel, as indicated by a tire 100 and hub 101, is then placed on the flange portion 82 of the outer member 76. The weight of the wheel causes the springs 85 to extend and conical end 77, which is normally recessed in the outer member 76, to extend upwardly above the flanges or shelf means 82 until the conical surface 78 engages the internal annular edge 102 of the wheel and centers the wheel concentrically with the vertical axis of the pin 27 and sphere 26.

The wheel 100 contacting the surface 78 also creates a downward force on the vertically slidable member 21 and compresses the spring 45 causing the valve part 41 to move downwardly, as shown in FIG. 4, and to open communication between passageways 49, 50. Air moving through the passageway 49 will first close the ball valve 60. The spring 37 is not sufficiently strong to retain the ball valve 60 open against the pressure of the air on the underside of the ball valve. However, as air is bled through the groove 62 in the seat 61 into the midpassage, the air pressure plus the spring pressure on the top of the ball valve will cause the valve to open and permit air to pass under the main ball or sphere 26 and between the sphere 26 and conical surfaced socket 24. The sphere 26 is then floating on an air pocket. Upon this occurring, any imbalance in the wheel, however slight, will be evident since the wheel will move the wheel supporting members 75, 76 out of plum in respect to the vertical. The latter condition will be indicated by the indicating device 81. Upon the wheel being removed, the air is automatically shut off since the valve part 41 will move to its upper or shut off position.

While only one form of the invention has been shown, it should be recognized that other forms and variations will occur to those skilled in the art. Therefore, while the preferred form has been shown and described in detail for the purpose of clearly and concisely illustrating the principles of the invention, it is not the intention to limit or narrow the invention beyond the broad concept set forth in the appended claims.

What is claimed is:

1. A device for indicating the location of imbalance in a wheel comprising: an upright pedestal; a member slidably carried on the pedestal for vertical movement, having an inverted upwardly opening conical cavity and an air passage extending through the member and opening into the base of the cavity; means between the member and pedestal biasing the member to an upper position; air conduit means connected with the passage and extending therefrom downwardly to a lower end connected with a pressurized source of air; a first valve in the conduit means operatively connected with the member to effect opening of the conduit means in response to downward movement of the member from its upper position; a valve ball means in the conduit means above the first valve and including a seat, a ball member upstream of the seat for substantially closing the conduit means, an element in the conduit means effecting a force directed against the seating of the ball, and an air bleeding passage in the valve ball means for permitting a small movement of air irrespective of the ball being seated; telescoping inner and outer wheel supporting members having inner and outer engaging cylindrical surfaces respectively, the inner member having an upper and outer conical shaped portion for receiving the inner annular edge of a wheel, and the outer member having an upper radial surface for receiving the underface of a wheel; and spring means between the inner and outer members normally biasing the outer member to an upper position in which the conical portion of the inner member is recessed in the outer member and yieldable upon weight being applied to the outer member to permit the conical portion to be exposed; and a bearing member supported on the inner member and having a lower spherical surface adapted to seat in the upwardly opening conical cavity.

2. A device for indicating the location of imbalance in a wheel comprising: an upright pedestal; a socket member slidably carried on the pedestal for vertical movement having an upwardly opening socket and an air passage opening into the underside of the socket; means between the member and pedestal biasing the member to an upper position; air conduit means connected with the passage and extending therefrom to a pressurized air source; a valve in the conduit means operatively connected with the member to open in response to downward movement of the member from its upper position; a valve seat in the conduit means above the valve; a ball member upstream of the seat for substantially closing the conduit means; an air bleeding passage bypassing the ball and seat for permitting a small movement of air irrespective of the ball being seated; means biasing the ball member into open position upon the air pressure approaching equilibrium on all sides of the ball member; telescoping inner and outer wheel supporting members, the inner member having an upper and outer conical shaped portion for receiving the inner annular edge of a wheel, and the outer member having a laterally extending portion for receiving the underface of a wheel; and spring means between the inner and outer members normally biasing the outer member to an upper position in which the conical portion of the inner member is recessed in the outer member and yieldable upon the weight of a wheel being applied to the outer member to permit the conical portion to be exposed and to transfer at least part of the weight of the wheel to the inner member; and a downwardly facing bearing member internally supported by the inner member and having a lower spherical surface adapted to seat in the upwardly opening socket whereby the weight of the wheel will be transferred to the socket member to move the latter member downwardly and open the valve.

3. A device for indicating the location of imbalance in a wheel comprising: an upright pedestal; a socket member slidably carried on the pedestal for vertical movement having an upwardly opening socket and an air passage opening into the underside of the socket; means between the member and pedestal biasing the member to an upper position; air conduit means connected with the passage and extending therefrom to a pressurized air source; a valve in the conduit means operatively connected with the member to open in response to downward movement of the member from its upper position; a valve seat in the conduit means above the valve; a ball member upstream of the seat for substantially closing the conduit means; an air bleeding passage bypassing the ball and seat for permitting a small movement of air irrespective of the ball being seated; means biasing the ball member into open position upon the air pressure approaching equilibrium on all sides of the ball member; telescoping inner and outer wheel supporting members, the inner member having a portion for receiving the inner annular edge of a wheel, and the outer member having a laterally extending portion for receiving the underface of a wheel; and spring means between the inner and outer members normally biasing the outer member to an upper position in which the edge receiving portion of the inner member is recessed in the other member and yieldable upon the weight of a wheel being applied to the other member to permit the edge receiving portion to be exposed and to transfer at least part of the weight of the wheel to the inner member; and downwardly facing bearing member internally supported by the inner member and having a lower spherical surface adapted to seat in the upwardly opening socket whereby the weight of the wheel will be transferred to the socket member to move the latter member downwardly and open the valve.

4. A device for indicating the location of imbalance in a wheel comprising: an upright pedestal; a member supported on the pedestal having an upwardly opening socket and an air passage opening into the underside of the socket; air conduit means connected with the passage and extending therefrom to a pressurized air source; a valve in the conduit means; a valve seat in the conduit means beyond the valve; a ball member upstream of the seat for substantially closing the conduit means; an air bleeding passage bypassing the ball and seat for permitting a small movement of air irrespective of the ball being seated; means biasing the ball member into open position upon the air pressure approaching equilibrium on all sides of the ball member; vertically telescoping wheel supporting members, one of the members having a portion for receiving the inner annular edge of a wheel, and the other member having a laterally extending portion for receiving the underface of a wheel; and means between the members normally biasing said other member to an upper position in which the edge receiving portion is recessed in the other member and yieldable upon the weight of a wheel being applied to said other member to permit the edge receiving portion to be exposed and to transfer at least part of the weight of the wheel to said one member; a downwardly facing bearing member internally supported by the wheel supporting member having a lower spherical surface adapted to seat in the upwardly opening socket whereby the weight of the wheel will be transferred to the socket member; and means responsive to weight being applied to the wheel supporting members to open the valve to pass air between the socket and spherical surface.

5. A wheel balancing device comprising: an upright pedestal having means at its upper end defining one part of a ball and socket joint with an air passage opening into the upper end; air conduit means connected with the passage and extending therefrom downwardly to a remote end connected with a pressurized source; a first valve in the conduit means; a valve in the conduit means above the first valve and including a valve seat, a valve member seated therein for substantially closing the conduit means, an element in the conduit means effecting a force directed against the seating of the valve member and an air bleeding passage bypassing the valve member and seat for permitting a small movement of air irrespective of the valve member and seat being closed; wheel supporting structure for receiving the underface of a wheel and having a centrally located means defining a second part of the ball and socket joint; and means operatively connecting the first valve to the supporting structure effecting opening of the valve in response to weight being applied to the supporting structure whereby the ball and socket will be journaled on a film of air.

6. A device for indicating the location of imbalance in a wheel comprising: an upright pedestal having means at its upper end defining one part of a ball and socket joint with an air passage opening to the upper end; air conduit means connected with the passage and extending therefrom to a remote end connected with a pressurized source; a valve in the conduit means including a valve seat, a valve member seated therein for substantially closing the conduit means, an element effecting a force directed against the seating of the valve member, and an air bleeding passage opening to opposite sides of the seat and valve member to bypass the valve member and seat for permitting a small movement of air to pass irrespective of the valve member being seated; wheel supporting structure for receiving the underface of a wheel and having a centrally located means defining a second part of the ball and socket means and cooperative with the first part whereby the ball and socket will be journaled on a film of air.

References Cited by the Examiner

UNITED STATES PATENTS 2,565,732   8/1951   Koertge et al. _____ 73—484
3,229,528   1/1966   Hemmeter _____ 73—484

RICHARD C. QUEISSER, *Primary Examiner.*

J. J. GILL, *Assistant Examiner.*